(No Model.) 2 Sheets—Sheet 1.
L. H. WHITNEY.
Silo.
No. 238,466. Patented March 1, 1881.
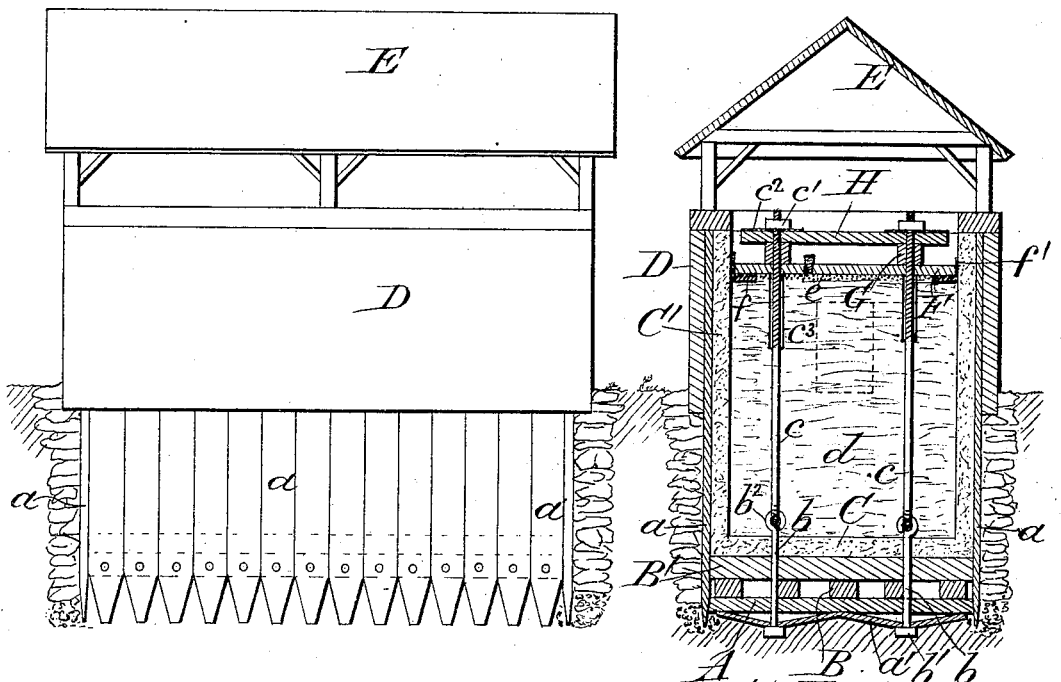
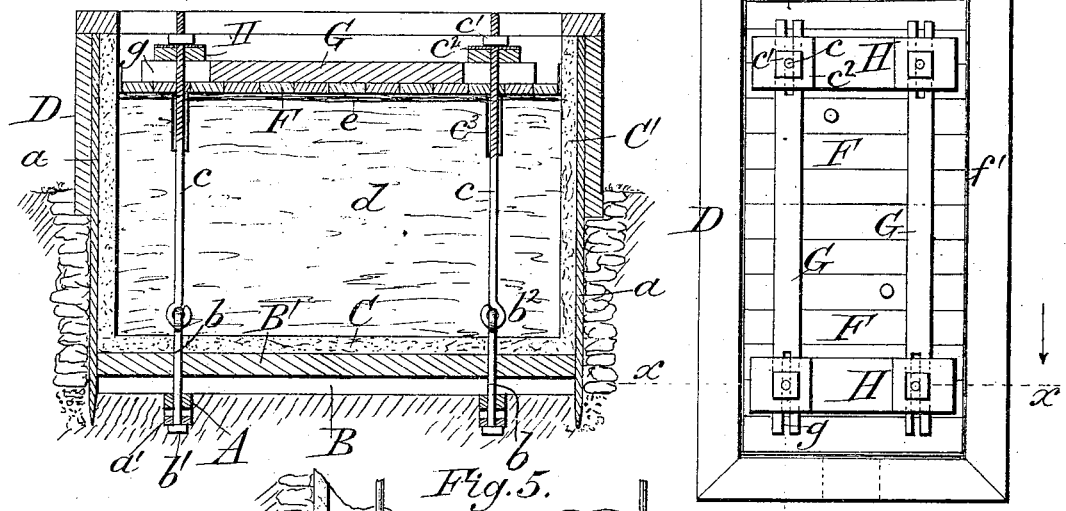
Attest:
H. H. Schott
A. R. Brown
Inventor:
Levi H. Whitney
Geo. J. C. Tasker atty

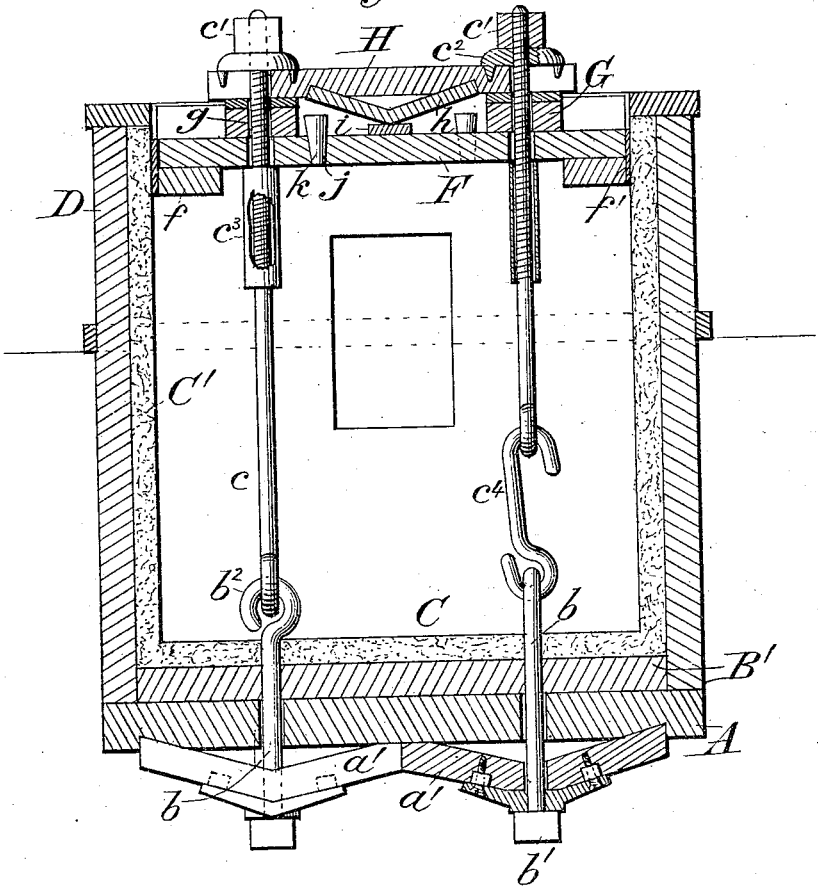

UNITED STATES PATENT OFFICE.

LEVI H. WHITNEY, OF LOWELL, MASSACHUSETTS.

SILO.

SPECIFICATION forming part of Letters Patent No. 238,466, dated March 1, 1881.

Application filed January 12, 1881. (No model.)

*To all whom it may concern:*

Be it known that I, LEVI H. WHITNEY, a citizen of the United States, residing at Lowell, in the county of Middlesex and State of Massachusetts, have invented certain new and useful Improvements in Silos; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to the preservation of ensilage or green fodder in structures known as "silos;" and it consists in an improved method of applying continuous pressure to the contents of such repositories, as hereinafter more fully set forth, whereby the requisite degree of compression for forcing out the inclosed air and gases is readily attained.

By a "silo" is meant a repository for grain and fodder, preferably constructed of masonry or concrete in such a manner as to be water and air tight at the bottom and sides. It may be built above ground, or partly or entirely below the surface. Its shape may be square, rectangular, round, or oval, with perpendicular sides, and its top should be covered by a suitable shed or inclosed building. The silo is designed to be used for the storage, in their green state, of forage crops and grasses. This forage, when brought from the field, is run through a suitable cutter, that reduces it to pieces less than half an inch in length, when it is then packed down solidly in the silo and subjected to continuous pressure. Green fodder preserved in this way is known as "ensilage." When properly packed and compressed the air and gases inclosed with the ensilage are continually forced out between the covering-planks as the mass shrinks under pressure, and fermentation being thus retarded, or, to a great extent, prevented, the fodder is caused to retain its succulent qualities unimpaired for a great length of time. The high cost of all kinds of fodder for winter feeding is by this means greatly reduced, its quality being also better than that prepared by desiccation in the ordinary manner, and thus a great obstacle to raising stock at a profit is obviated.

Silos are usually built of brick or stone masonry and concrete, and may be located partly above and partly below ground. The side of a hill may often be excavated and utilized to advantage in the construction of a silo, and, being leveled off above, will afford a convenient means of access when hauling fodder to be packed therein.

In the annexed drawings, in which similar letters indicate like parts in the several views, Figure 1 illustrates a side view of a form of silo the construction of which is especially adapted for low marshy grounds, or for wet sandy river-lands, where it is necessary to employ piles or plank spiles in order to secure a firm foundation. Fig. 2 is a vertical transverse section of the same on the line $x\ x$, Fig. 4. Fig. 3 is a vertical longitudinal section on the line $y\ y$, Fig. 4, which represents a top-plan view. Fig. 5 is an enlarged sectional detail, and Fig. 6 is a vertical transverse section of a silo as built on firm hard ground.

The silo shown in Sheet 1 of the drawings is constructed in the following manner: A suitable location having been selected, the plank spiles $a$ are driven into the ground closely together, so as to inclose an excavated space of the required size for the ground-plan. At the bottom of this space are embedded the truss-beams A, two or more in number. Each beam is provided on its under surface with two or more crowns or braces, $a'$, through the center of which are passed the iron eyebolts $b$, that extend upward through the main truss-beam and flooring, and are secured beneath by nuts $b'$. The truss-beam A supports the joists B, on which is laid a wood floor, B'. This makes a firm foundation for the concrete or cement floor C. The inner walls, C', are now built of masonry or other suitable material, preferably concrete, as shown in the drawings, and the stone or wooden casing D being put in position, a shed or suitable roofed building, E, is erected over the whole. In order to protect the lumber employed from the effects of dampness, and thus retard its decay, it should be treated with asphaltum before being used.

In the silo shown in Fig. 6 the spiles $a$ and joists B are dispensed with, while the outer casing, D, is made to extend downward to the truss-beam A, on which it rests. This form of silo, as well as that shown in Figs. 1 and 2, is preferably constructed partly below the surface of the ground.

The manner of securing the contents of the silo after it is filled is as follows: The lower hooked ends of the rods $c$ are attached to the eyes $b^2$ of the bolts $b$, that project upward above the concrete floor C. These rods are screw-threaded at their upper ends, which are fitted with nuts and washers $c'$ $c^2$, and may be held in a vertical position while the silo is being filled by means of ropes secured above to the rafters. In order to prevent the screw-threaded portions of the rods $c$ from becoming rusted by contact with any moisture contained in the ensilage, these rods are provided with short tubes $c^3$, that cover the screw-threaded portion of the rods at the top of the ensilage. The rods $c$ may be made in sections or provided with hooked links $c^4$, if desired.

After the fodder has been cut into pieces of suitable size and packed within the silo, as indicated at $d$, Figs. 2 and 3, until it is filled, or the desired quantity has been introduced, a layer of straw, $e$, may be placed over the top. This, however, may be dispensed with, if desired. Suitable wooden strips, $f$, are now embedded in the ensilage at the sides and ends of the silo, as shown in Fig. 6. These strips are provided with leather packing $f'$, that rests against the walls of the silo. Above these strips and resting upon them are laid the planks F, which are placed transversely, and over these are arranged longitudinally the stringers G G, on each side of and between the rods $c$ $c$. These stringers may be ordinary strips of lumber, or may be made in one piece and have recessed ends $g$ $g$, to fit around the rods $c$, if desired. Similar recessed or perforated cross-pieces or trusses, H H, are then placed above the stringers, extending transversely across the silo, around and between the rods $c$ $c$, and the washer $c^2$ being placed in position, the nuts $c'$ are passed over the ends of the rods $c$, and being turned by means of suitable wrenches or levers, the cross-pieces and stringers are caused to force the plank covering F down, thus compressing the fodder beneath. In Fig. 6 the cross pieces or trusses H are provided on their under side with braces $h$, that rest on a central stringer, $i$, and thus effectually prevent any tendency of the plank covering F to bulge in the center. While pressure is thus being applied to the contents of the silo, the contained air and gases are permitted to escape through the openings $j$ in the plank covering F, which openings are afterward closed by plugs $k$, that prevent the entrance of air and moisture from without.

These openings may also be utilized for the insertion of metal tubes, through which a thermometer may be introduced in order to ascertain the temperature of the ensilage from time to time, as desired. By means of the leather packing $f'$ on the strips $f$ the plank covering F is caused to fit snugly within the sides and ends of the silo, and prevent the access of air and moisture at the edges.

Heretofore the fodder or ensilage contained in the silo has been compressed by means of heavy weights—such as bowlders, sand-boxes, or bricks—piled upon the top of the plank covering. This is objectionable, however, for many obvious reasons. Such material is not always at hand. It is cumbersome and inconvenient to handle, and will not exert so steady and uniform a pressure as the devices that have been above described.

By means of my simple compressing devices a strong and uniform pressure is imparted to the surface of the ensilage, that is transmitted throughout its entire mass, and whenever desired the nuts may be easily loosened and the covering-planks raised for the purpose of removing a part or introducing more ensilage, as required. A suitable door is also provided at one end of the silo, by which access may be had when it is not desired to disturb the plank covering.

Having thus described my invention, what I claim as new, and desire to secure by Letters Patent, is—

1. In a silo for storing and compressing ensilage or green forage crops, the combination, with the truss-beams A, having crowns or braces $a'$ $a'$ and eyebolts $b$, of the vertical rods $c$, provided with nuts $c'$ and washers $c^2$, substantially as specified.

2. The combination, in a silo, of the truss-beams A, having braces $a'$ and eyebolts $b$, joists B, flooring B' C, vertical rods $c$, having nuts $c'$, washers $c^2$, and covering-tubes $c^3$, perforated plank covering F, having plugs $k$, strips $f$, provided with packing $f'$, stringers G G $i$, and cross-pieces or trusses H, substantially as shown and described.

3. In a silo, the combination, with the side walls, C', and casing D, of the plank spiles $a$ $a$, for the purpose of securing a firm foundation and strengthening said walls, substantially as set forth.

In testimony whereof I affix my signature in presence of two witnesses.

LEVI H. WHITNEY.

Witnesses:
   CHARLES R. BLAISDELL,
   LE GROSS KEYES.